Feb. 19, 1963  E. W. ALLARDT ET AL  3,077,768
WELD INSPECTION DEVICE SUPPORT AND MANIPULATOR
Filed Aug. 29, 1957  8 Sheets-Sheet 1

INVENTORS
*Ernst W. Allardt*
BY *Albert M. DeStephen*
ATTORNEY

Feb. 19, 1963 E. W. ALLARDT ET AL 3,077,768
WELD INSPECTION DEVICE SUPPORT AND MANIPULATOR
Filed Aug. 29, 1957 8 Sheets-Sheet 3

INVENTORS
Ernst W. Allardt
BY Albert M. DeStephen
ATTORNEY

Feb. 19, 1963    E. W. ALLARDT ET AL    3,077,768
WELD INSPECTION DEVICE SUPPORT AND MANIPULATOR
Filed Aug. 29, 1957    8 Sheets-Sheet 7

FIG. 12-A

INVENTORS
Ernst W. Allardt
BY Albert M. DeStephen
*J.P. Moran*
ATTORNEY

FIG. 12-B

INVENTORS
Ernst W. Allardt
BY Albert M. DeStephen
ATTORNEY

United States Patent Office 3,077,768
Patented Feb. 19, 1963

3,077,768
WELD INSPECTION DEVICE SUPPORT
AND MANIPULATOR
Ernst W. Allardt, Marlboro, and Albert M. De Stephen, Alliance, Ohio, assignors to The Babcock & Wilcox Company, New York, N.Y., a corporation of New Jersey
Filed Aug. 29, 1957, Ser. No. 681,091
14 Claims. (Cl. 73—67.8)

This invention relates to weld inspection apparatus and, more particularly, to novel support and manipulating means for detection means forming part of weld inspection apparatus used in the production of electric resistance welded tubing.

In recent years, ultrasonic inspection has become an accepted technique for determining the soundness of welded joints. In this technique, a "beam" of ultrasonic energy is directed into a welded joint by a transmitter and the ultrasonic energy passing through or reflected from the joint is detected by a receiver including means providing a visual indication of the interior of the welded joint and any discontinuities therein.

A known apparatus for ultrasonic inspection of electric resistance welded tubing in a production line includes a tank through which the tubing passes immediately after leaving the welding electrodes, this tank being filled with a suitable liquid, preferably water, to a level above the tubing. The ultrasonic energy is directed into the welded joint by means of a crystal supported on a search tube, and which is accurately oriented and positioned relative to the welded joint. The position and orientation of the crystal relative to the welded tubing must be accurately maintained irrespective of lateral or vertical shifting of the welded tubing as it passes through the tank. In addition, the search tube must be so mounted that it can be readily moved out of operative relation with the tubing, as when terminating a "run" of welded tubing and starting a new "run" thereof.

It is furthermore highly desirable that means be provided whereby the inspection apparatus may be checked periodically as to overall operativeness and proper orientation and relative positioning of the crystal with the search tube displaced from the production line. It is also desirable to move the search tube out of the way when the welder is stopped, and substantially instantaneously if the tubing buckles threatening damage to the inspection apparatus.

The present invention is directed to a support and manipulator for an ultrasonic inspection search tube including manual adjustments for the search tube, and manual and automatic controls for operating the support and manipulator. The support and manipulator is so designed as to hold the crystal accurately oriented and positioned relative to the welded seam in the tubing while providing for movement of the search tube to accommodate vertical and lateral movement of the tubing. The support and manipulator further provides for lateral movement of the search tube from a position in the water tank in the tube mill line to a position in a "test" tank laterally of the line and containing a piece of electric resistance welded tubing. This tubing has a manufactured or purposeful defect in its welded seam and is used for periodic checking and calibration of the test apparatus.

The controls are designed to effect automatic raising of the search tube out of the mill tank responsive to deactivation of the resistance welder, and to open gates in the mill tank to empty the latter. When the resistance welder is re-started, the controls effect automatic lowering of the search tube into the mill tank, closing of gates in the latter onto the tubing, and re-filling of the mill tank with water. Manual over-riding controls are also provided.

More specifically, the support and manipulator comprises a mounting base adapted to be positioned midway between the mill tank and test tank. A table is mounted on the base for rotation about a vertical axis, and this table carries vertical guide means on which are slide means forming part of a cantilever bracket means. The free end of the bracket means carries a support means mounted thereon for limited lateral and vertical movement, and carrying roller means engageable with the tubing. This support means has mounted thereon a search tube carrier which is angularly adjustable relative to the support means. A search tube supporting a crystal is mounted on the carrier for lateral and angular adjustment relative thereto.

The slide means is elevated and lowered by a fluid pressure actuator mounted on the table, and scale means are provided for adjusting the effective lowering stroke of the actuator in accordance with the outer diameter of the tubing being welded. A feeler switch is provided in engagement with the tubing for activating the actuator to raise the slide if an abnormal irregularity in the tube surface is encountered by the feeler switch which is somewhat upstream from the search tube. The rotary table is latchable in two diametrically opposite positions, in one of which the search tube is over the mill tank and in the other of which the search tube is over the test tank.

For an understanding of the invention principles, reference is made to the following description of a typical embodiment thereof as illustrated in the accompanying drawing. In the drawing:

FIGS. 2A and 2B together constitute a vertical sectional view of the support and manipulator;

Referring to FIGS. 1, 2A, 2B and 3, the support and manipulator 10 is arranged to be mounted laterally adjacent a production or mill line for electric resistance welded tubing 11 at a position where the tubing emerges from the resistance welder (not shown) and enters a sizing mill (not shown). Support and manipulator 10 is designed to accurately position and orient an ultrasonic testing device, such as an ultrasonic crystal 15 mounted in a search tube 135 relative to the resistance weld 12 in tubing 11.

As tubing 11 leaves the resistance welder, it passes through a mill tank 140, described more fully hereinafter, containing a liquid such as water to a level sufficient to submerge tubing 11. In passing through tank 140, tubing 11 engages sealing gaskets in the tank end walls to prevent loss of fluid from the mill tank. Support and manipulator 10 is arranged to lift and swing search tube 135 and crystal 15 between a position in mill tank 140 in operative relation to tubing 11 and a position in a "test" tank 16 positioned laterally of the mill line in alignment with the mill tank. Test tank 16 has mounted therein a piece or coupon 13 of electric resistance welded tubing having a manufactured or purposeful defect in its resistance weld zone 14. This defect may, for example, comprise a sawcut 0.010" wide, 0.006" deep, and about ¾" long. Tubing 13 provides for periodic testing and calibration of the test apparatus while search tube 135 and crystal 15 are in the test tank so that, when the search tube and crystal are moved into the mill tank, no further adjustment is needed.

As will be described hereinafter, the support and manipulator 10, and mill tank 140, are adapted for operation with tubing of various diameters as indicated by the tubes 11, 11' and the coupons 13, 13'.

Support and manipulator 10 is positioned for swinging movement about a vertical axis exactly half-way between the center line of tubing 11, 11' (center line of the mill line) and the center line of coupons 13, 13'. For this purpose, a support base 20 is accurately positioned halfway between these center lines. Base 20 comprises a lower section 21, fixed on a horizontal bracket 22 extending laterally of the mill line, and an upper section 23 secured to section 21 by headed studs 24 extending through slots 26 in a flange 27 in section 21 and threaded into a flange 28 of section 23. These slots provide for accurate adjustment of section 23 relative to the mill line, such adjustment being effected by set screws 29 threaded into flange 27 and engaging studs 26. Bracket 22 also supports mill tank 140 and test tank 16.

Section 23 has a circular flange 25 on its upper end serving as a support for a rotary table 30. Table 30 is supported on an annular anti-friction bearing 31 seated in a circular recess 32, in the upper surface of flange 25, and an annular groove in the lower surface of table 30. A cylindrical depending collar 33 on table 30 surrounds flange 25 and has rollers 34 mounted therein with their axes radial of collar 33. Rollers 34 engage the undersurface of flange 25 and are adjustable vertically of collar 33 to maintain table 30 parallel to flange 25.

Table 30 provides for swinging movement of support and manipulator 10 to align crystal 15 with either tubing 11, 11' or coupons 13, 13'. The support and manipulator is locked in either of these two positions by a crank 35 pivoted on a post on table 30 and connected to a pin 36 secured to a tapered head slidable in a guide bushing 39 and engageable in either of a pair of diametrically opposite tapered bushinged apertures 37 in the upper surface of flange 25. A coil spring 38 biases the tapered head on pin 36 to enter the tapered bushinged apertures 37.

A clamping plate 41 extends diametrically of table 30 at right angles to the diameter intersecting pin 36. Plate 41 has a pair of circular apertures 42 at equal distances either side of the axis of rotation of table 30, and apertures 42 receive cylindrical columns 40 having base flanges 43 beneath plate 41. Studs 44 secure plate 41 to table 30 to clamp flanges 43 thereagainst. Slide sleeves 45 are slidably and rotatably mounted on columns 40 by means of vertically spaced ball bushings 46 secured in each sleeve. A strap 47 interconnects the upper ends of columns 40, being recessed to seat the upper ends of the columns and secured thereto by studs 48.

Sleeves 45 form integral parts of a cantilever support 49 including a web 51 interconnecting sleeves 45, spaced parallel webs 52 each extending radially of a sleeve 45, a pair of sleeves 50 at the outer ends of webs 52, an apertured top wall 53, and a transverse web 54 interconnecting sleeves 50. Sleeves 50 have fixedly mounted therein vertically spaced ball bushings 56 engaging vertical shafts 55 to allow limited free vertical movement thereof for a purpose to be described.

Figures 3, 4:
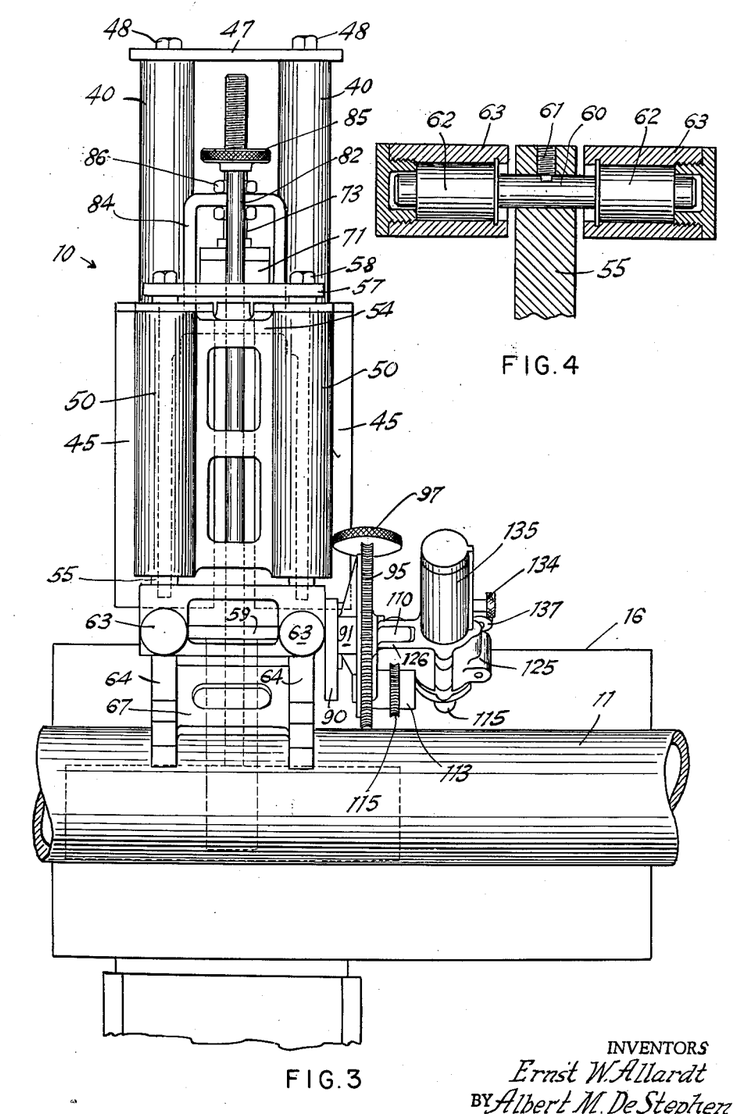
FIG. 3 is a side elevation view of the support and manipulator.
FIG. 4 is a sectional view taken along line 4—4 of FIG. 1.

The upper ends of shafts 55 are rigidly interconnected by a strap 57 recessed to fit these upper ends and connected thereto by studs 58. The lower ends of shafts 55 have extending therethrough, parallel to webs 52, horizontal shafts 60 secured against movement by set screws 61 (FIG. 4). Shafts 60 extend through horizontally spaced ball bushings 62 fixed in sleeves 63 interconnected by a strap 59 and each integral with a depending vertical plate 64 having a 90 degree V notch 66 in its lower edge bisected by the axis of the associated shaft 55. A brace 67 interconnects plates 64.

Each side of the V notch 66 in each plate 64 has a rectangular recess 68 therein receiving a roller 65 rotatable on a shaft 69. The axis of rollers 65 are normal to each other, and these rollers ride along tubing 11, 11'. The limited free vertical movement of shafts 55 in ball bushings 56 accommodates vertical deflection of tubing 11, 11', and the limited free horizontal movement of ball bushings 62 on shaft 60 accommodates horizontal deflection of tubing 11, 11'. Rollers 65 thus closely follow movements of tubing 11, 11' as the latter passes under the rollers and maintain crystal 15 fixed laterally and vertically relative to tubing 11, 11'.

Before describing the adjustable supporting means mounting crystal 15 and its search tube 135 on support 49, reference will be made to the means for raising and lowering this support. This means comprises a fluid pressure actuator 70 including a cylinder 71 and a piston 72 having a piston rod 73 having a threaded upper end. The base 74 of cylinder 71 is bolted to the horizontal leg of an angle bracket 75 having a vertical leg formed with a vertical slot 76 receiving a boss 77 on cylindrical collar 33. Boss 77 is apertured and threaded to receive the threaded stem 78 of a locking clamp 80.

A scale 79 on the side of slot 76 is cooperable with a pointer 81 secured on table 30. Scale 79 is graduated in tubing sizes so that the vertical position of bracket 75 and actuator 70 relative to table 30 may be adjusted and set in accordance with the size tubing 11, 11' being welded. Vertical adjustment of bracket 75 is effected by a rod 82 threaded through the horizontal leg of bracket 75 and having its lower end engaging table 30. The upper part of rod 82 extends rotatably through a bearing 83 on top wall 53 of support 50, an operating knob 85 being secured to the upper end of shaft or rod 82. By turning knob 85, actuator 70 is adjusted vertically relative to table 30, and is locked in adjusted position by clamp 80.

Stem 73 of actuator 70 extends through top wall 53 of support 50 and through the horizontal leg of an inverted U-shaped strap bracket 84 secured to the upper surface of wall 53. Stem 73 is clamped to bracket 84 by nuts 86 on the stem above and below the horizontal leg of the bracket. It will be clear that extension and retraction of actuator 70 will raise and lower support 49, the adjustable lower limit of movement coinciding with a position in which rollers 65 engage the upper quadrants of the particular size tubing 11, 11' being seam welded.

The adjustable supporting means for mounting crystal 15 on support 49 includes bosses 87 on one pair of sleeves 63, these being tapped and having plane vertical faces engaged by a mounting plate 90 secured to the bosses by studs 88 threaded through plate 90 into the bosses. A hub 91 is threaded into plate 90 and rotatably supports a worm gear 95 engaged by a worm 92 on a shaft 93. Shaft 93 is rotatably mounted in axially spaced bearings supported in correspondingly spaced ears 94 projecting from a bracket 96 pivoted at one end to plate 90. Adjustment of worm 92 into playless engagement with gear 95 is effected by a stud 98 threaded through a bracket 99 on plate 90 and engaging the radially outer ear 94. Stud 98 has a lock nut thereon and bracket 96 is secured in adjusted position by a stud 101 extending through an arcuate slot in the outer end of the bracket and threaded into plate 90. An operating knob 97 is secured to the outer end of shaft 93.

Gear 95 has a 360 degree scale 103 thereon cooperable with a pointer 104 threaded into plate 90 and having a bent outer end extending over gear 95. Gear 95, rotated by turning knob 97, revolves the crystal mounting through a range of 230 degrees about weld 12.

Figures 1, 5:
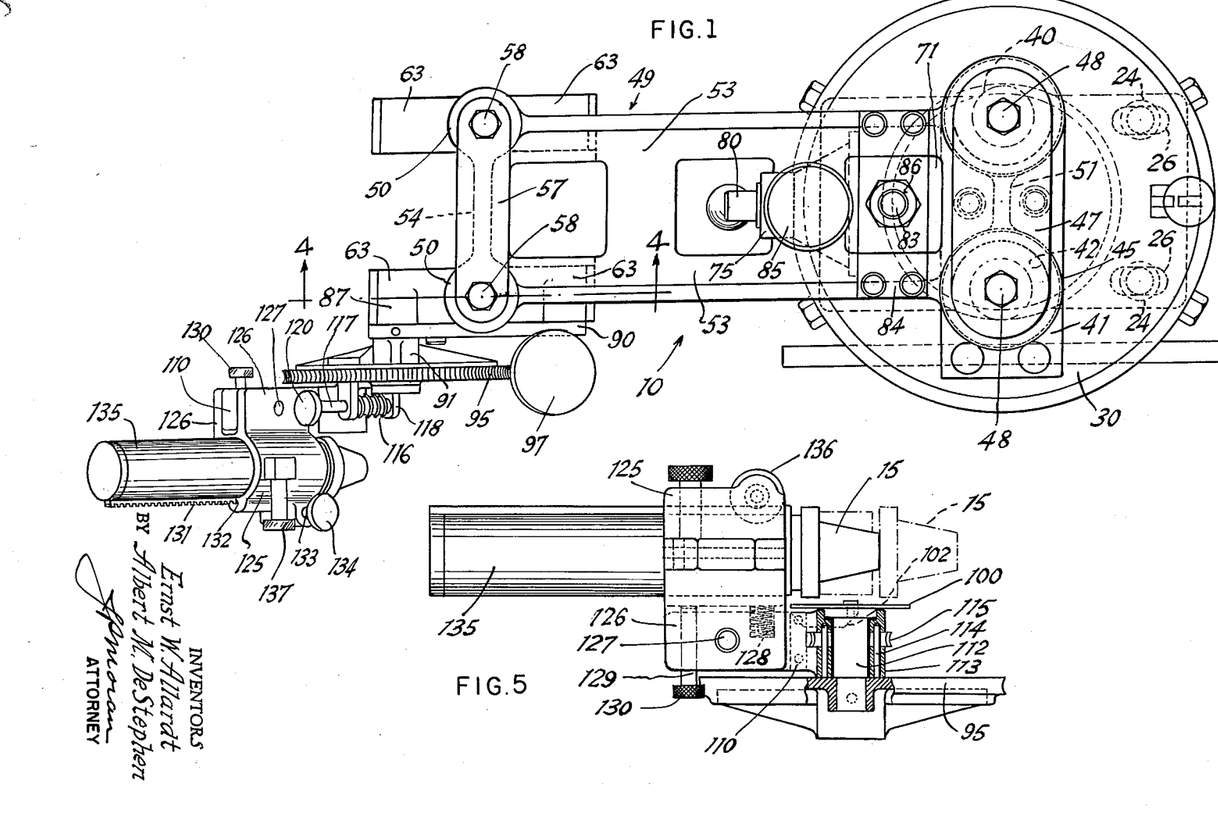
FIG. 1 is a plan view of the support and manipulator for an ultrasonic test device.
FIGS. 5–8 are views on the correspondingly numbered lines of FIG. 2.
Figures 2, 6, 7:
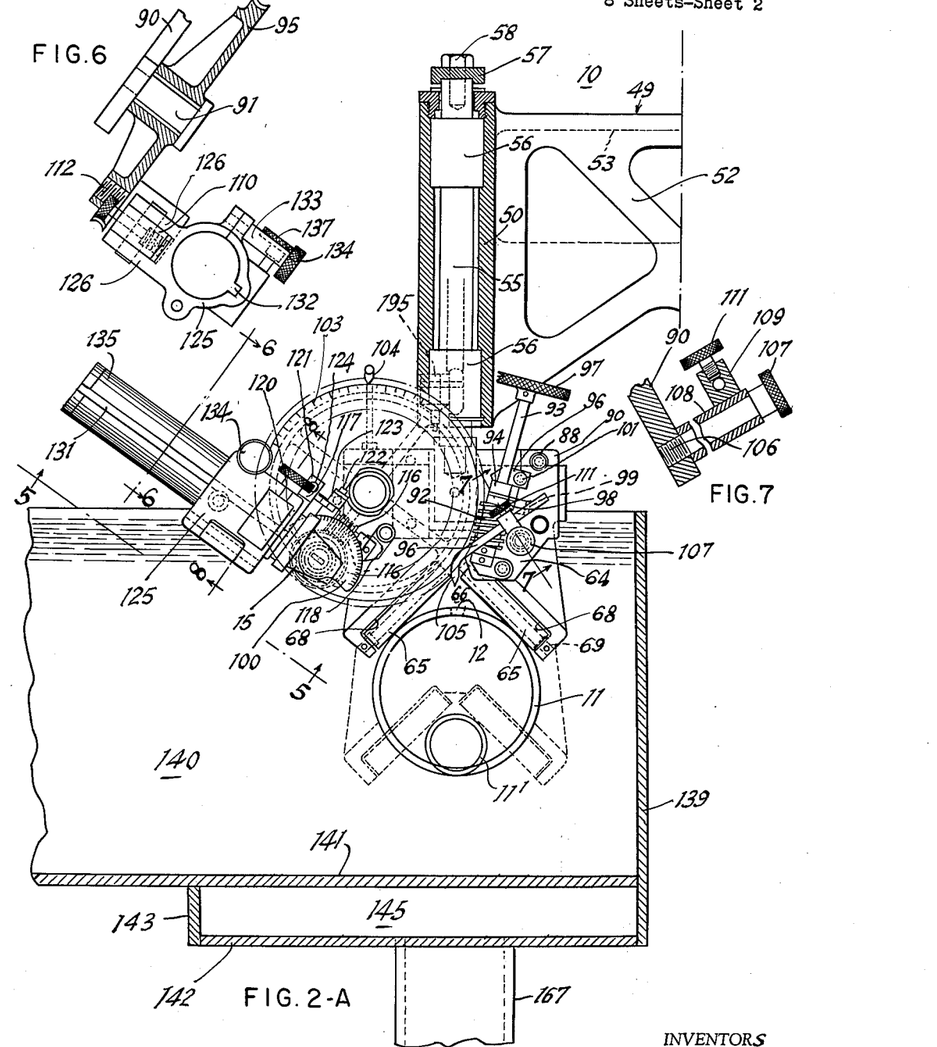
Figures 2, 8:
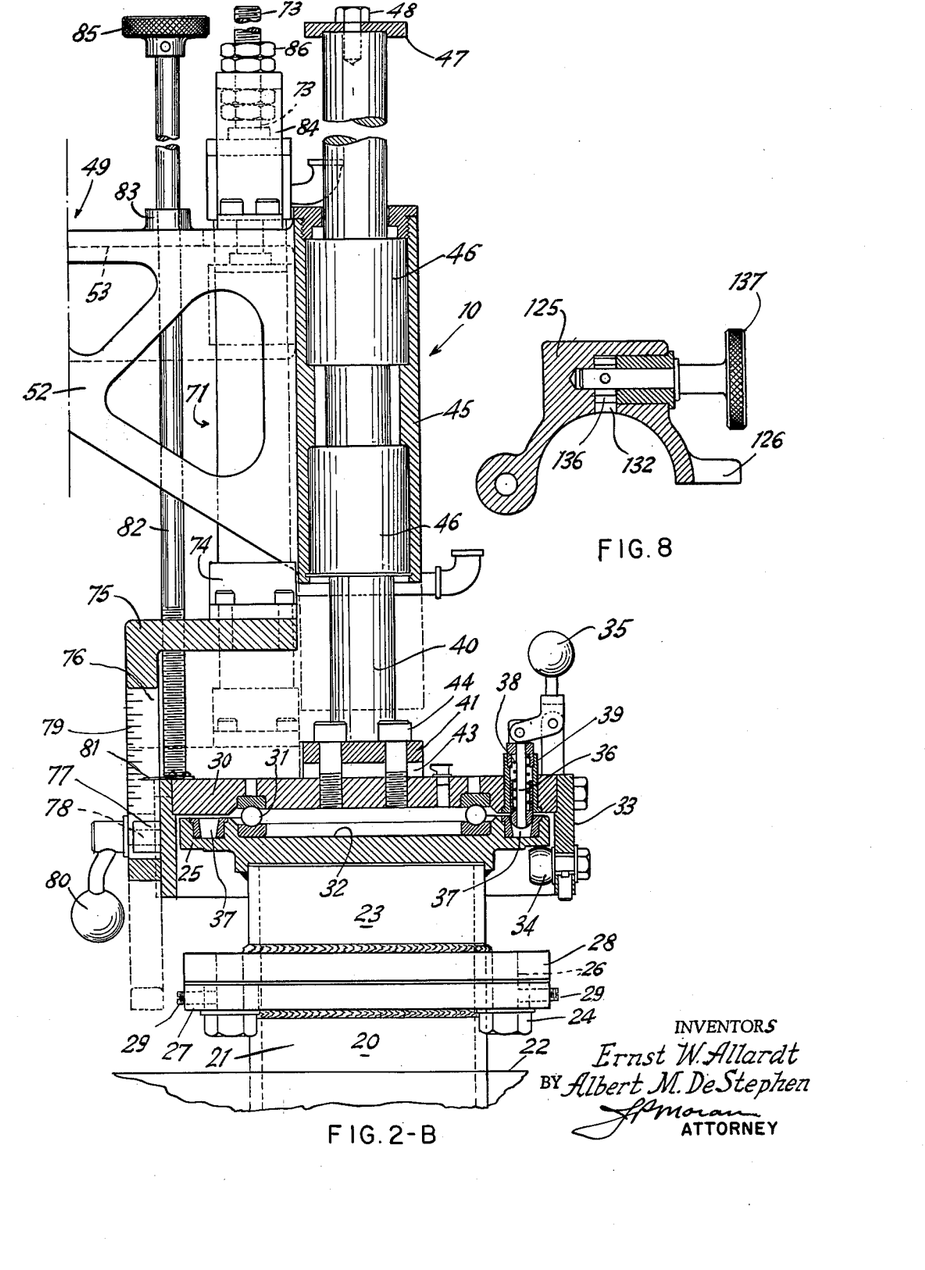

As best seen in FIGS. 2A, 2B and 7, a shouldered stud 106 is threaded into plate 90 adjacent bracket 96 and is formed with a knurled operating head 107. A sleeve 108 on stud 106 has welded thereto an apertured block 109 through which extends a bent pointer 105 arranged to have its indicating end centered on weld 12. A thumb set screw 111 clamps pointer 105 in its adjusted position. The angular position of the pointer is adjustable by loosening stud 106, turning sleeve 108, and re-tightening the stud.

Pointer 105 is initially adjusted into alignment with weld 12. Thereby, any variation in the orientation of weld 12 can be readily detected by observation of the relation of weld 12 to pointer 105. Should any such variation be noted, suitable readjustments can be made in the crystal mounting to properly re-position and re-orient the crystal relative to weld 12.

Referring to FIGS. 1, 2A, 2B, 3, 5 and 6, a stud 112 is threaded into gear 95 near its outer periphery and rotatably supports the hub 113 of a radial bar 110. A scale 100 is suitably fixed to the outer end of stud 112 and cooperates with a pointer 102 secured to bar 110. An annular worm gear 115 is secured to hub 113 by pins 114 and engaged by a worm 116 on a shaft 117 having an operating knob 120. Shaft 117 is rotatably mounted in axially spaced bearings supported in correspondingly spaced ears 118 projecting from a bracket 121 pivoted at one end to gear 95. Adjustment of worm 116 into playless engagement with worm gear 115 is effected by a stud 122 threaded through a bracket 123 on worm 95 and engaging the radially outer ear 118. Stud 122 has a lock nut thereon and bracket 121 is secured in adjusted position by a stud 124 extending through an arcuate slot in the outer end of bracket 121 and threaded into gear 95.

A hinged bracket 125 has a pair of parallel flanges 126 between which bar 110 extends, bracket 125 being pivoted to bar 110 by pin 127 extending through flanges 126 and bar 110. On one side of pin 127, bar 110 has a recess seating a coil spring 128 bearing against bracket 125. On the other side of pin 127, a stud 129 having an operating head 130 is threaded through bar 110 with its inner end engaging bracket 125.

Figures 9, 11:
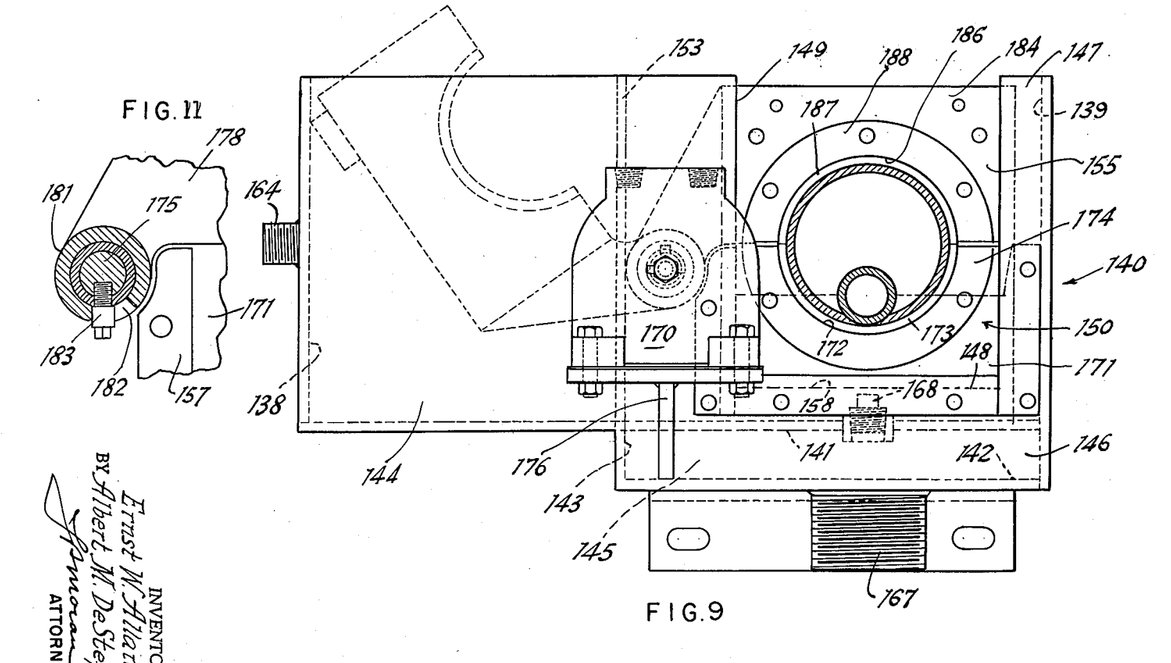
FIG. 9 is a front elevation view of the mill tank.
FIG. 11 is a vertical sectional view of the mill tank on the line 11—11 of FIG. 10.

Bracket 125 embraces search tube 135 which has a rack 131 extending therealong and through a keyway 132 in bracket 125 (FIGS. 6 and 9). The bracket is clamped around search tube 135 by a stud 133 rotatably extending through one part of bracket 125 and threaded into the other part thereof. Stud 133 has an operating head 134.

Crystal 15 is supported on the inner end of search tube 135 and the spacing of crystal 15 from tubing 11, 11' is adjusted by a spur gear 136 rotatably mounted in bracket 125 and meshing with rack 131. Gear 136 has an operating knob 137. After search tube 135, and thus crystal 15, are longitudinally adjusted by rotating spur gear 136, stud 133 is screwed in to lock hinged bracket 125 on the search tube. The pivotal mounting of bar 110 in bracket 125, in association with spring 128 and stud 129, constitutes a "wobble drive" to adjust crystal 15 to the correct electronic right angle. This adjustment is effected by means of knob 130.

Figure 10:
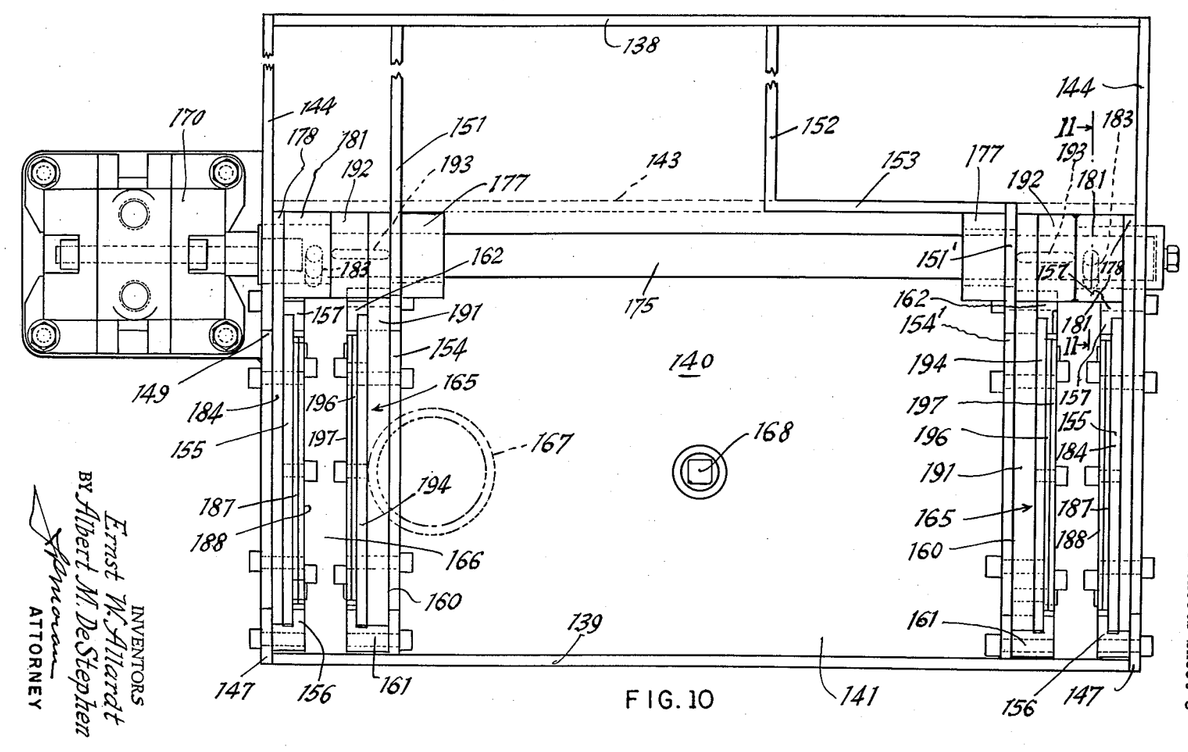
FIG. 10 is a plan view of the mill tank.

Referring to FIGS. 9, 10 and 11, mill tank 140 comprises a welded structure including fixed side walls 138, 139, an inner bottom wall 141 extending interconnecting both side walls, and an outer bottom wall 142 extending between and interconnecting side wall 139 and a partition 143 extending downwardly from wall 141. Fixed end walls 144 extend from side wall 138 toward side wall 139. These end walls extend above bottom wall 141 the full height of the side walls for about half their lengths, and are formed with narrow extensions 146 joining bottom wall 141 to bottom wall 142, partition 143, and the extending part 147 of side wall 139, the upper edges of the extensions being slightly above floor or bottom wall 142. Walls 141 and 142, partition 143, and extensions 146 define an outlet chamber 145 beneath wall 141. Vertical strips 147 extend inwardly from each end of side wall 139 and strips 148 extend horizontally from the lower inner edges of strips 147 to the inner edges 149 of end walls 144.

An "inner" tank within tank 140 is defined by a partition 151 extending between walls 138, 139 parallel to wall 144, a short partition 152 normal to wall 138, another short partition 153 parallel to wall 138, and a partition 151' extending from partition 153 to wall 139 parallel to the other end wall 144. Partitions 151, 151' form "inner" end walls for the tank and have upwardly opening rectangular recesses 154, 154' therein corresponding in size and location with the similar recesses in the outer end walls defined by parts 147, 148, 149.

Facing vertical channel members 156, 157 are secured to the inner surfaces of strips 147 and of walls 144 at edges 149, and upwardly facing channel members 158 extend between channel members 155, 157. These latter channel members extend about one-half the height of tank 140. Similarly, somewhat thicker facing vertical channel members 161, 162 extend along the outer surfaces of partitions 151, 151' along the vertical edges of recesses 154, 154', and upwardly facing channel members 163 extend between members 161, 162. Channel members 161, 162 extend about one-half the height of partitions 151, 151'.

Water is admitted to the "inner" tank through an inlet nipple 164 in wall 138. Between each inner and outer end wall or partition, bottom wall 141 has apertures 166 communicating with chamber 145 which has a large nipple 167 connected to a drain. A drain plug 168 is also provided in bottom wall 141 within the "inner" tank.

Channel members 156, 157, 158 locate and support interchangeable outer end wall sections 150 cooperable with outer gates 155 to close the end walls of tank 140. Similarly, channel members 161, 162, 163 locate and support interchangeable inner end wall sections 160 cooperable with inner gates 165 to close the end walls of the "inner" tank. Each outer end wall section 150 comprises a plate 171, removably seated in channels 156, 157, 158 and having an upwardly facing semi-circular recess 172, and a semi-annular flexible sealing gasket 173 held against the inner surface of plate 171 by a semi-annular clamping plate 174 bolted to plate 171. Similarly, each inner end wall section comprises a plate, removably seated in channels 161, 162, 163, and similarly formed with an upwardly facing semi-circular recess bounded by a flexible gasket held in place by a clamping plate.

The outer and inner gates 155, 165 are arranged to be opened and closed by a fluid pressure motor 170, supported on a T-shape bracket 176 welded to an end wall 144, and having a shaft 175 extending through bearings 177 on the end walls 144 and partitions 151, 151'. Shaft 175 is located a short distance inwardly of partition 153.

Each outer gate 155 comprises a flat arm 178 apertured to receive shaft 175 and welded to a collar 181 rotatable on the shaft. Each collar 181 has an arcuate slot 182 extending through about 45 degrees and receiving a radial pin 183 secured to the shaft. A plate 184 is interchangeably bolted to each arm 178 and has a downwardly facing semi-circular recess 186 in its inner edge bounded by a semi-annular flexible gasket 187 secured against the outer surface of a plate 184 by a semi-annular clamp 188 bolted to each plate 184.

Each inner gate 165 comprises a relatively thick flat arm 191 apertured to receive shaft 175 and welded to a collar 192. A key 193 secures plate 191 and collar 192 against rotation relative to shaft 175. A plate 194 is interchangeably bolted to arm 191 and has a semi-circular recess in its inner edge bounded by a semi-annular flexible gasket 196 held in place against the outer surface of plate 194 by a semi-annular clamp plate bolted to plate 194.

The lost motion connection provided by slot 182 and pin 183 is so designed that, when motor 170 rotates shaft 175 in a gate opening direction, inner gates 165 start to open before the outer gates 155. Hence, the major part of the water in the "inner" tank flows through apertures 166 in bottom wall 141 into outlet chamber 145, and thus to drain, before outer gates 155 open. This prevents an excessive discharge of water onto the mill line, reducing possible dilution and contamination of the reclaimable coolant flowing over the welded tubing.

From FIGS. 10 and 11 it will be noted that end wall sections 150, 160 and gate plates 184, 194 with their attached gaskets are readily interchangeable, in accordance with the diameter of the tubing being welded, so that the inner circumferences of the gaskets have a close sealing fit with the tubing. The end wall sections are merely lifted from their channels and replaced, and plates 184, 194 are unbolted from arms 178, 191, respectively, and replaced.

The operation of the device will be explained with reference to FIGS. 2A, 2B, 12A and 12B. Briefly, the arrangement is such that, when the tube mill is energized, the mill tank end gates 155, 165 are automatically closed after a predetermined time interval, with inner gates 165 closing before outer gates 155, the mill tank 140 is then automatically filled with water, and then the manipulator and support automatically lowers the inspection device to engage rollers 65 with the tubing 11, 11'. When the tube mill is de-energized, the inspection device is automatically lifted out of operative position and then inner end gates 165 of mill 140 are opened followed by opening of outer end gates 155.

Figure 12:
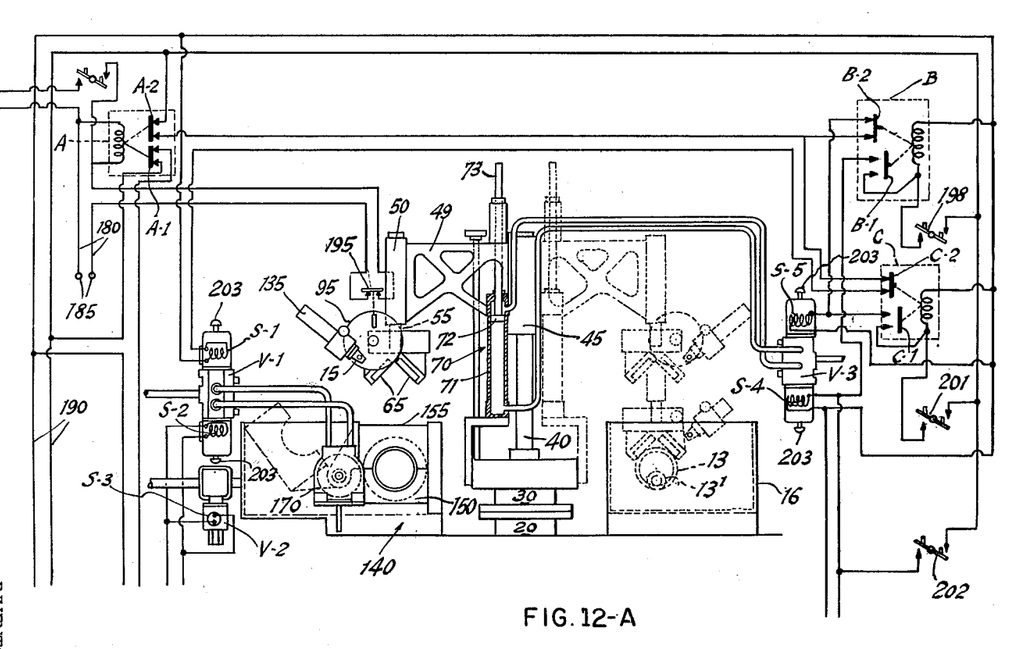
FIGS. 12A and 12B together constitute a schematic hydraulic and wiring diagram of the control system.

Referring to FIGS. 12A and 12B when the welding line push button is closed, relay A is energized from a 110 volt A.C. source over conductors 180 leading from terminals 185. Normally closed contacts A-1 open to de-energize the coil of timer T, and normally closed contacts A-2 open to de-energize solenoid S-1 of valve V-1 controlling operation of hydromotor 170.

There is a time delay before effective operation of timer T in order that the burnt hand hole in tubing 11, 11' (provided therein for access to the inside bead trimmer) can pass through the mill tank 140 without damaging the gaskets in gates 155, 165. After this time delay, timer T opens its contacts T-2 and closes its contacts T-1. This connects 110 volt A.C. supply line 190 to solenoid S-2 of valve V-1, to solenoid S-3 of normally closed water valve V-2, and to the coil of timer W. Valve V-1 shifts to allow air to enter hydromotor 170 closing gates 165 and 155 of mill tank 140 in sequence, and valve V-2 opens to fill the tank to overflowing.

There is a time delay before operation of timer W responsive to opening of contacts T-2 of timer T. After an interval, timer U opens its contacts U-2 and closes its contacts U-1. Opening of contacts U-2 de-energizes solenoid S-2, closes valve V-2 and de-energizes the coil of timer W. Closing of contacts U-1 energizes solenoid S-4 of valve V-3 to operate this valve to admit air into actuator 70 above piston 72 and connect the cylinder 71 to exhaust below piston 72. This lowers the inspection device into the mill tank 140.

After a time delay, timer W. operates to open its contacts W-2 and close its contacts W-1. Opening of contacts W-2 de-energizes solenoid S-4 of valve V-3. There is thus no potential applied to any of the solenoids when the welder is operating.

Microswitch 195 prevents damage to the inspection device if tubing 11, 11' buckles upwardly. This switch is in the energizing circuit of relay A, which also includes the welding line push button. Should either switch 195 or the push button be operated, relay A is de-energized to close its contacts A-1 and A-2.

Closure of contacts A-2 energizes solenoids S-1 and S-5. Solenoid S-1 activates hydromotor 170 to open gates 165 and 155 of mill tank 140 in sequence. Solenoid S-5 operates valve V-3 to admit air beneath piston 72 to lift the inspection device out of the mill path. Closure of contacts A-1 energizes the coil of timer T which immediately opens its contacts T-1 and closes its contacts T-2. This energizes the coil of timer U. If the welder is shut down for any length of time, push button line switch 200 should be opened to de-energize the coils of timers T and U and the solenoids S-1 and S-5.

The operator can now, if desired, rotate table 30 to bring the inspection device over test tank 16. By closing push button 198, relay B is energized to close its contacts B-1 and open its contacts B-2. Closure of contacts B-1 energizes solenoid S-4 to lower the inspection device as previously described. Opening push button 198 de-energizes relay B to close contacts B-2 and open contacts B-1. Closure of contacts B-2 energizes solenoid S-5 to raise the inspection device out of test tank 16.

If the mill line is operating, the inspection device may be raised by closing push button 201. This energizes relay C to open contacts C-2 and close contacts C-1. Closing contacts C-1 energizes solenoid S-5 to raise the inspection device as described. Push button 202 should be opened to de-energize solenoid S-4. To lower the inspection device into test tank 16, after 180 degrees rotation, push button 201 is opened to de-energize relay C and solenoid S-5, and push button 202 is closed to energize solenoid S-5.

The several solenoids S-1, S-2, S-4 and S-5 are provided with buttons 203 which, when pressed, energize the respective solenoid. These buttons may be rotated to lock them in the out position. The speed of hydromotor 170 and actuator 70 may be adjusted by adjusting exhaust plugs on solenoid operated valves V-1 and V-3.

While a specific embodiment of the invention has been shown and described in detail to illustrate the application of the invention principles, it will be understood that the invention may be embodied otherwise without departing from such principles.

What is claimed is:

1. Mechanism for supporting and manipulating an inspection device relative to a longitudinal seam weld progressively formed by welding apparatus positioned in a mill line, said mechanism comprising, in combination, a horizontal base mounted laterally adjacent the mill line; a horizontal table rotatably mounted on said base; relatively rigid vertical column means mounted on said table; a slide mounted on said column means; actuator means on said table connected to said slide to raise and lower said slide along said column means; a cantilever support extending horizontally from said slide; mounting means having limited free movement on the free end of said support; work engaging guide means on said mounting means and arranged to ride on the work to guide said mounting means relative to said seam weld; an inspection device; positioning means mounting said device on said mounting means for accurately orienting said inspection device relative to said tube; and means releasably locking said table with said support extending normal toward the mill line.

2. Mechanism for supporting and manipulating an inspection device relative to the weld zone of electric resistance welded tubing being progressively welded in a tubing mill line, said mechanism comprising, in combination, a mill tank disposed in the mill line for passage of the tubing therethrough; means for supplying water to said mill tank to submerge the tubing passing therethrough; relatively rigid vertical column means mounted laterally adjacent said mill tank; a slide mounted on said column means; a cantilever support extending horizontally from said slide; mounting means having limited free movement on the free end of said support; work engaging guide means on said mounting means and arranged to ride on the tubing to guide said mounting means relative to said weld zone; an inspection device; positioning means mounting said device on said mounting means for accurately orienting said inspection device relative to said tube; and actuator means connected to said slide to raise and lower said slide along said column means to move said device into and out of said mill tank.

3. Mechanism for supporting and manipulating an inspection device relative to the weld zone of electric resistance welded tubing being progressively welded in a tubing mill line, said mechanism comprising, in combination, a mill tank disposed in the mill line for passage of the tubing therethrough; means for supplying water to said mill tank to submerge the tubing passing therethrough; a horizontal base mounted laterally adjacent said mill tank; a horizontal table rotatably mounted on said base; relatively rigid vertical column means mounted on said table; a slide mounted on said column means; a cantilever support extending horizontally from said slide; mounting means having limited free movement on the free end of said support; work engaging guide means on said mounting means and arranged to ride on the tubing to guide said mounting means relative to said weld zone; an inspection device; positioning means mounting said device on said mounting means for accurately orienting said inspection device relative to said tube; and actuator means on said table connected to said slide to raise and lower said slide along said column means to move said device into and out of said mill tank.

4. Mechanism for supporting and manipulating an inspection device relative to various sized seam tubes being progressively welded in a tubing mill line, said mechanism comprising, in combination, a mill tank disposed in the mill line for passage of the tubing therethrough; means for supplying water to said mill tank to submerge the tubing passing therethrough; a horizontal base mounted laterally adjacent said mill tank; a horizontal table rotatably mounted on said base; relatively rigid vertical column means mounted on said table; a slide mounted on said column means; a cantilever support extending horizontally from said slide; mounting means having limited free movement on the free end of said support; work engaging guide means on said mounting means and arranged to ride on the tubing to guide said mounting means relative to said weld zone; an inspection device; positioning means mounting said device on said mounting means; actuator means on said table connected to said slide to raise and lower said slide along said column means to move said device into and out of said mill tank; and gauge means operable to adjust said actuator relative to a particular tube size for limiting the movement of said actuator means in lowering said slide.

5. Mechanism for supporting and manipulating an inspection device relative to the weld zone of electric resistance welded tubing being progressively welded in a tubing mill line, said mechanism comprising, in combination, a mill tank disposed in the mill line for passage of the tubing therethrough; means for supplying water to said mill tank to submerge the tubing passing therethrough; a horizontal base mounted laterally adjacent said mill tank; a horizontal table rotatably mounted on said base; relatively rigid vertical column means mounted on said table; a slide mounted on said column means; a cantilever support extending horizontally from said slide; mounting means having free limited movement on the free end of said support, work engaging guide means on said mounting means and arranged to ride on the tubing to guide said mounting means relative to said weld zone; an inspection device; positioning means mounting said device on said mounting means; and actuator means on said table connected to said slide to raise and lower said slide along said column means to move said device into and out of said mill tank; control means operable, responsive to upward deflection of the tubing in said mill tank, to energize said actuator means to elevate said slide.

6. Mechanism for supporting and manipulating an inspection device relative to the weld zone of electric resistance welded tubing being progressively welded in a tubing mill line, said mechanism comprising, in combination, a mill tank disposed in the mill line for passage of the tubing therethrough; means for supplying water to said mill tank to submerge the tubing passing therethrough; a horizontal base mounted laterally adjacent said mill tank; a horizontal table rotatably mounted on said base; relatively rigid vertical column means mounted on said table; a slide mounted on said column means; a cantilever support extending horizontally from said slide; mounting means having free limited movement on the free end of said support, work engaging guide means on said mounting means and arranged to ride on the tubing to guide said mounting means relative to said weld zone; an inspection device; positioning means mounting said device on said mounting means; and actuator means on said table connected to said slide to raise and lower said slide along said column means to move said device into and out of said mill tank; a test tank on the opposite side of said base from said mill tank; and means releasably locking said table with said support extending normal toward the mill line or normal toward said test tank.

7. Mechanism as claimed in claim 3 in which said mill tank has cooperable lower end wall sections and upper gates in its end wall cooperably embracing the tubing to form a fluid tight seal thereat; and operating means for swinging the gates into and out of operative position in response to the lowering and raising of said slide, respectively.

8. Mechanism for supporting and manipulating an inspection device relative to the weld zone of electric resistance welded tubing being progressively welded in a tubing mill line, said mechanism comprising, in combination, a mill tank disposed in the mill line for passage of the tubing therethrough; means for supplying water to said mill tank to submerge the tubing passing therethrough; a horizontal base mounted laterally adjacent said mill tank; a horizontal table rotatably mounted on said base; relatively rigid vertical column means mounted on said table; a slide mounted on said column means; a cantilever support extending horizontally from said slide; mounting means having free limited movement on the free end of said support, work engaging guide means on said mounting means and arranged to ride on the tubing to guide said mounting means relative to said weld zone; an inspection device; positioning means mounting said device on said mounting means; and actuator means on said table connected to said slide to raise and lower said slide along said column means to move said device into and out of said mill tank, automatic control means operable sequentially to energize said operating means to swing the gates to operative position, to operate said supply means to fill the mill tank with water, and to energize said actuator means to lower said slide.

9. Mechanism as claimed in claim 8 including manually operable overriding means to effect raising and lowering of said slide by said actuator means.

10. Mechanism as claimed in claim 3 in which said mill tank has cooperable lower outer end wall sections and upper outer gates in its end walls cooperably embracing the tubing to form a fluid tight seal thereat; wall means defining an inner tank within said mill tank; cooperable lower inner end wall sections and upper inner gates in the end walls of said inner tank cooperably embracing the tubing to form a fluid tight seal thereat; an outlet chamber beneath said mill tank; means connecting the spaces between the outer end wall sections and gates and the inner end wall sections and gates to said outlet chamber; and operating means for swinging the gates into and out of operative position in response to the lowering and raising of said slide, respectively.

11. Mechanism as claimed in claim 10 in which said operating means opens said inner gates in advance of opening said outer gates.

12. Mechanism as claimed in claim 10 in which said end wall sections and gates are readily interchangeable to cooperate with tubing of different diameters.

13. An apparatus for inspecting a longitudinal seam weld as it is being progressively formed in a work piece subjected to limited vertical and lateral movement comprising a mounting means having limited free movement in a vertical and lateral direction, a work engaging guide means connected to said mounting means and arranged to ride on the work piece to guide said mounting means relative to the seam weld of said moving work piece, an inspection device, and positioning means for mounting said inspection device onto said mounting means for accurately orienting the inspection device in the plane of revolution disposed normal to the longitudinal axis of said seam weld, said positioning means including a gear rotatably mounted on said mounting means the plane of said gear being disposed normal to the axis of said seam weld, means for rotating said gear in a plane of revolution normal to said seam weld, and means forming an adjustable connection between said inspection device and said gear for adjusting the inspection device to a predetermined angle in relation to the workpiece.

14. A mechanism for supporting and manipulating an inspection device relative to a longitudinal seam weld as it is progressively formed in a workpiece subjected to limited vertical and lateral movement comprising, in combination, a relatively rigid vertical column means mounted adjacent to the seam weld, a slide mounted on said column means for movement relative thereto, an actuator means connected to said slide to raise and lower said slide along said column means, support means connected to and extending outwardly from said slide, mounting means having limited free movement in vertical and lateral directions connected to said support means, a work engaging guide means connected to said mounting means and arranged to ride on the workpiece to guide said mounting means relative to said seam weld, an inspection device, and positioning means mounting said inspection device onto said mounting means including a gear rotatably mounted on said mounting means, the plane of said gear being disposed substantially normal to the axis of said seam weld, and means connecting said inspection device to said gear for adjusting the inspection device to a predetermined angle in relation to the workpiece.

References Cited in the file of this patent
UNITED STATES PATENTS

| | | |
|---|---|---|
| 2,468,648 | Abbott et al. | Apr. 26, 1949 |
| 2,602,990 | Ferguson | July 15, 1952 |
| 2,678,559 | Drake | May 18, 1954 |
| 2,771,714 | Schmidt et al. | Nov. 27, 1956 |
| 2,795,133 | Ots | June 11, 1957 |
| 2,799,157 | Pohlman | July 16, 1957 |
| 2,908,161 | Bincer | Oct. 13, 1959 |